United States Patent [19]

Brezoczky et al.

[11] Patent Number: 4,925,700
[45] Date of Patent: May 15, 1990

[54] PROCESS FOR FABRICATING HIGH DENSITY DISC STORAGE DEVICE

[75] Inventors: Blasius Brezoczky, San Jose, Calif.; Jerome J. Cuomo, Lincolndale, N.Y.; C. Richard Guarnieri, Somers, N.Y.; Kumbakonam V. Ramanathan, Troy, N.Y.; Srinvasrao A. Shivashankar, Mt. Kisco, N.Y.; David A. Smith, Katonah, N.Y.; Dennis S. Yee, Pleasantville, N.Y.

[73] Assignee: International Business Machines Corporation, Armonk, N.Y.

[21] Appl. No.: 263,839

[22] Filed: Oct. 28, 1988

[51] Int. Cl.⁵ ..................... H01F 10/02; B05D 3/06
[52] U.S. Cl. ................................ 427/38; 427/128; 427/129; 427/130; 427/250; 427/255.2; 427/255.3; 427/314; 427/374.1; 427/398.3
[58] Field of Search ............... 427/38, 250, 127–132, 427/48, 255.2, 255.3, 314, 374.1; 428/900, 694

[56] References Cited

U.S. PATENT DOCUMENTS 4,634,600 1/1987 Shimizu et al. ................. 427/38

*Primary Examiner*—Bernard Pianalto
*Attorney, Agent, or Firm*—Roy R. Schlemmer, Jr.

[57] ABSTRACT

A process for forming chromium dioxide thin films which are receptive to high density magnetic recording. The process comprises depositing both chromium and oxygen on a substrate by evaporative techniques and concurrently bombarding the substrate with high energy ions of at least one of the film constituents to form a latent $CrO_x$ film forming layer. The process is carried out at approximately room temperature.

The as-grown latent film forming layer is subsequently heat treated by a rapid thermal anneal step which raises the temperature of the as-grown film to about 500° C. The rapid thermal anneal step preferably comprises a series of at least five separte pulses over a 10-second time span. After the rapid thermal anneal, the sample is rapidly quenched to room temperature.

15 Claims, 6 Drawing Sheets

PROCESS FOR FABRICATING HIGH DENSITY DISC STORAGE DEVICE

FIELD OF THE INVENTION

The present invention relates to the field of high density recording systems suitable for computer data storage. More particularly, it relates to a new thin-film $CrO_2$ recording medium and to a method for producing same.

BACKGROUND OF THE INVENTION

Chromium dioxide ($CrO_2$) is well known for its use as a recording medium in high grade magnetic recording tapes. It is used in particulate form. This particulate form of the material prevents its application to high density (gigabit) storage. It has not been possible previously to make acceptable smooth, continuous thin films of $CrO_2$. This results from the metastable nature of $CrO_2$ at room temperature. The only previously known method of depositing thin films of $CrO_2$ has been by chemical transport methods ("Epitaxial Growth of $CrO_2$ on sapphire in air", Japan J. Appl. Phys., Vol. 17, (1978), 249.). This transport method used flowing $O_2$ at atmospheric pressure and high temperatures. The substrates are also heated. Due to the process control for the required film thickness, morphology, e.g., roughness, this method leads to additional processing requirements in order to obtain acceptable disc recording material. Attempts to deposit $CrO_2$ by conventional reactive vapor deposition, diode sputtering, magnetron sputtering, and ion beam sputtering have been unsuccessful. Particulate $CrO_2$ is usually made using equilibrium processing at high pressures and elevated temperatures. The particulate $CrO_2$ method is not compatible with the highest densities possible with disk recording.

Theoretical calculations have indicated that $CrO_2$ is also a useful recording material for magneto-optical recording ("$CrO_2$ predicted as a half-metallic ferromagnet", K. Schwarz, J. Phys. F. Met. Phys. Vol. 16 (1986) Op. 211-215.). The Faraday rotation is $-5.2 \times 10^4$ deg/cm for light of 2.5 eV photon energy.

Rapid thermal annealing is a known method step in semiconductor device processing which has been in use over the past few years. This method has been used in silicon device technology to:

(a) activate ion implanted impurities,
(b) grow thin films of $SiO_2$ on silicon,
(c) generally to crystallize disordered or amorphous layers.

In this method, the sample is brought up to a very high temperature (700°-1000° C.) in very short time (order of few milliseconds and shorter). Commercial equipment is available to do this flash annealing process.

When $CrO_x$ ($1.6 < x < 3$) coated samples produced by conventional reactive vapor deposition processes are post-heat treated under equilibrium or near equilibrium conditions in oxygen, for example, the film converts from an amorphous mixture to a crystalline $Cr_2O_3$ phase. Also, when these vapor deposited films are subjected to rapid thermal annealing, a non-equilibrium heat treatment technique, the same crystalline $Cr_2O_3$ phase is produced. This is because $Cr_2O_3$ is the thermodynamically stable oxide state in the Cr-O system.

SUMMARY AND OBJECTS

It is a primary object of the present invention to provide an improved chromium dioxide thin film recording medium and a method for producing same.

It is a further object of the present invention to provide an improved method for forming chromium dioxide ($CrO_2$) films particularly useful for high density magnetic recording.

It is a further object of the invention to provide such a process wherein an initial $CrO_x$ latent film forming mixture is deposited utilizing high energy ion beam bombardment during the deposition process followed by a rapid thermal anneal.

It is another object of the invention to provide such a method whereby suitable anisotropic dopants are introduced into the process during the concurrent vapor deposition and ion bombardment step in order to tailor the magnetic properties.

It is another object of the invention to provide such a process wherein a latent film mixture comprising $CrO_x$ is formed on a substrate by evaporating Cr from a metallic source and concurrently providing oxygen via energetic particle bombardment and subsequently processing the latent $CrO_x$ mixture by a rapid thermal anneal to selectively form chromium dioxide.

It is another object of the invention to provide such a process wherein the latent film forming chromium dioxide mixture may be deposited by other energetic particle bombardment means than ion bombardment during deposition prior to the rapid thermal anneal.

It is a further object of the invention to provide such a process wherein the energetic particle bombardment mechanism used to form the latent film forming $CrO_x$ mixture includes RF sputtering, magnetron sputtering, diode sputtering, ion plating, ion beam sputtering or arc evaporation of the metallic chromium in an $O_2$ atmosphere wherein chromium ions provide the energetic particle bombardment which produces active nuclei on the substrate in the latent mixture.

Other objects, features and advantages of the present invention will become apparent from the subsequent description of the invention and the accompanying drawings.

The objects of the present invention are accomplished by a process for forming thin films of chromium dioxide on a suitable substrate, which film is receptive to high density magnetic recording. The process comprises depositing both chromium and oxygen atoms on the substrate by evaporative techniques in an evacuated chamber and concurrently bombarding the substrate with high energy ions of at least one of the film constituents to form a latent $CrO_x$ film forming layer. The steps are carried out at approximately room temperature. The process is enhanced if the substrate is maintained at a temperature of between 10° and 40° C. The as-grown latent film forming layer is subsequently treated by a rapid thermal anneal step which raises the temperature of the as-grown film to about 500° C. within a time period of about 10 seconds after preheating the film to about 400° C. for about 90 seconds. The rapid thermal anneal step preferably comprises a series of at least five separate pulses over said 10-second time span. After the rapid thermal anneal the sample is rapidly quenched to room temperature.

DESCRIPTION OF THE PREFERRED EMBODIMENT

The present invention consists of a novel $CrO_2$ thin film structure and a process for making that structure. A plurality of steps are involved in the process. These are generally described below. First the structure (device) will be described, then the processing steps, and then some more structural and process considerations will be presented.

The structure is a $CrO_2$ thin film recording medium containing suitable anisotropic dopants with a thickness that is acceptable for the required magnetic recording bit density. This film is deposited onto a suitable substrate. For a magnetic recording medium, a substrate such as an aluminum alloy disc or a silicon wafer is used. The recording medium is then protected with a $Cr_2O_3$ film whose thickness is consistent with read-write head and recording medium separation. The thickness of typical films would be 1000 Å for the $CrO_2$ thickness and 150 Å for the $Cr_2O_3$. To optimize the $CrO_2$ magnetic properties, anisotropic dopant materials such as Fe, Co, Sb, In, etc. (or their compounds) may be added to the $CrO_2$. These techniques are well-known to those working in the magnetic recording field, e.g., "Advances in properties and manufacturing of chromium dioxide", H. Y. Chen, D. M. Hiller, J. E. Hudson, and C. J. A. Westembroek, *IEEE Transactions on Magnetics*, Vol. MAG-20, (1984) 25; and "Synthesis and properties of ferromagnetic chromium oxide", T. J. Sowboda, P. Arthur, N. I. Cox, N. Ingraham, A. L. Oppegard, and M. S. Sadler, *J. of Applied Physics*, Sup. to Vol. 32, No. 3, pg. 374S.

The process for depositing one or both of the films involves simultaneous vapor deposition of chromium and ion bombardment of the growing film with energetic oxygen particle ions, atoms or molecules. The relative metal atom, ion, and neutral background molecule fluxes and ion energies are determined by material requirements known to those skilled in the art. Both the $CrO_2$ and $Cr_2O_3$ films (if the latter is desired as an insulation or protective layer) can be deposited in one evaporation process cycle. The transition from one compound to the other, which is determined by the relative fluxes and energies of the particles arriving at the growing film surfaces, will be described subsequently.

The ion bombardment concurrent with film deposition produces an initial latent $CrO_x$ film mixture having active centers/sites that direct the path for nucleating the metastable nonequilibrium phase $CrO_2$. This reaction path requires that the chromium atom to oxygen ratio be in a range close to the $CrO_2$ composition, that the active centers/sites be induced by energetic particle bombardment (preferably oxygen), and that the thermal anneal be rapid and highly nonequilibrium.

The as-deposited or latent mixture films are amorphous and have poor magnetic properties. The magnetic properties of the amorphous $CrO_2$ are improved by nonequilibrium heating (e.g., rapid thermal annealing). This rapid thermal processing, to the knowledge of the inventors, has never been applied to nucleate or grow particular chromium oxide binary compound films. It has been used in silicon processing. The nonequilibrium nature of the annealing is used to prevent the nonferromagnetic $Cr_2O_3$ (the lowest energy phase) from growing. If the films have not been bombarded with ions during growth, the ferromagnetic $CrO_2$ state will not grow using this process. Accordingly, the ion bombardment, of one type or another, is a critical process parameter.

The $CrO_2$ is deposited by vapor depositing the Cr at a rate corresponding to 10–12 Å/sec while simultaneously bombarding the film with $O_2^+$ ions with an energy of 200–600 eV and beam current density of 0.5–2.5 ma/cm$^2$ with the substrate held at between 10°–40° C. These depositions should be done with an $O_2$ background pressure of between $5 \times 10^{-5}$ and $8 \times 10^{-5}$ Torr.

$Cr_2O_3$ may be deposited as part of the same overall process using procedures similar to the $CrO_2$ except that the deposition parameters are somewhat different. This insulating $Cr_2O_3$ material is deposited with substrate temperatures between 40°–80° C. using lower energy $O_2^+$ ions or mixtures of $Ar^+$ and $O_2^+$ ions. For these films $O_2^+$ ion energies of 200–600 eV and beam current densities of 0.5–2.5 ma/cm$^2$ in an $O_2$ background pressure of $8 \times 10^{-5}$ Torr are required. When mixtures of Ar and $O_2$ are used in the ion source, e.g., 50% of each, $Cr_2O_3$ films are always obtained.

Figure 1:
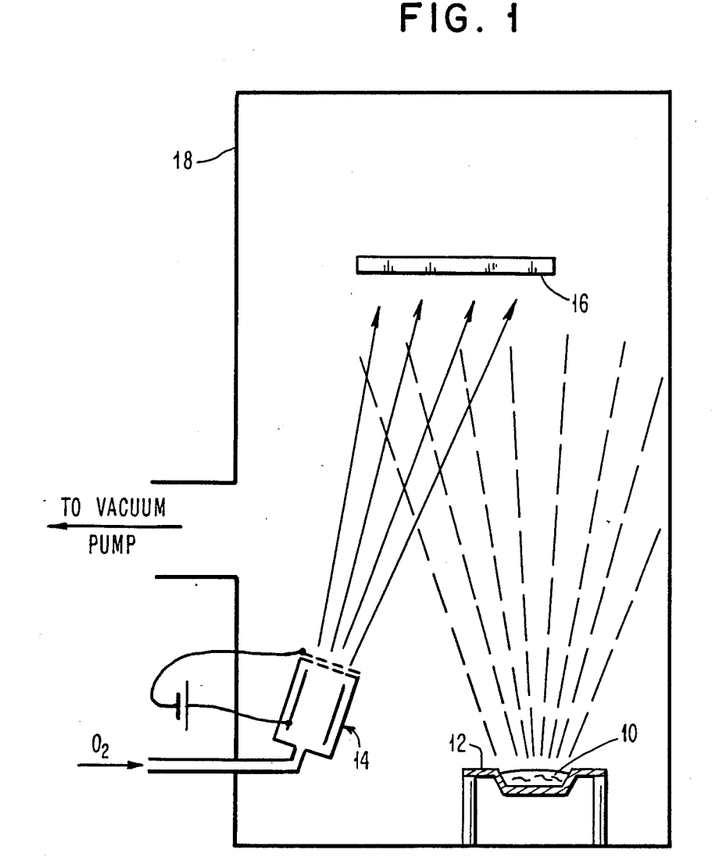
FIG. 1 comprises a cross-sectional view of typical apparatus which may be utilized in carrying out the present process for fabricating chromium dioxide thin films by evaporation with concurrent reactive ion bombardment.
Figure 2:
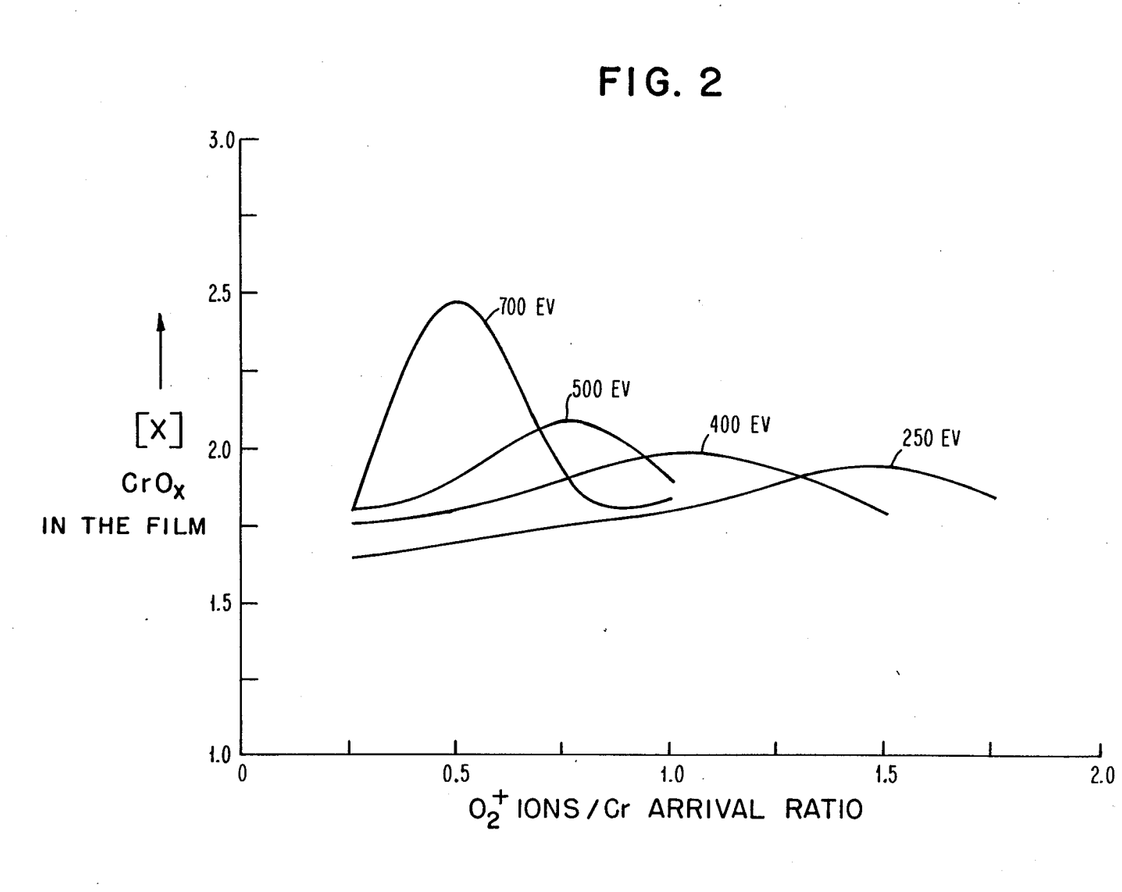
FIG. 2 comprises a series of curves with stoichiometry plotted versus the number of $O_2$ ions per chromium ion arriving at the target surface for a number of different ion beam energy levels.
Figure 3:
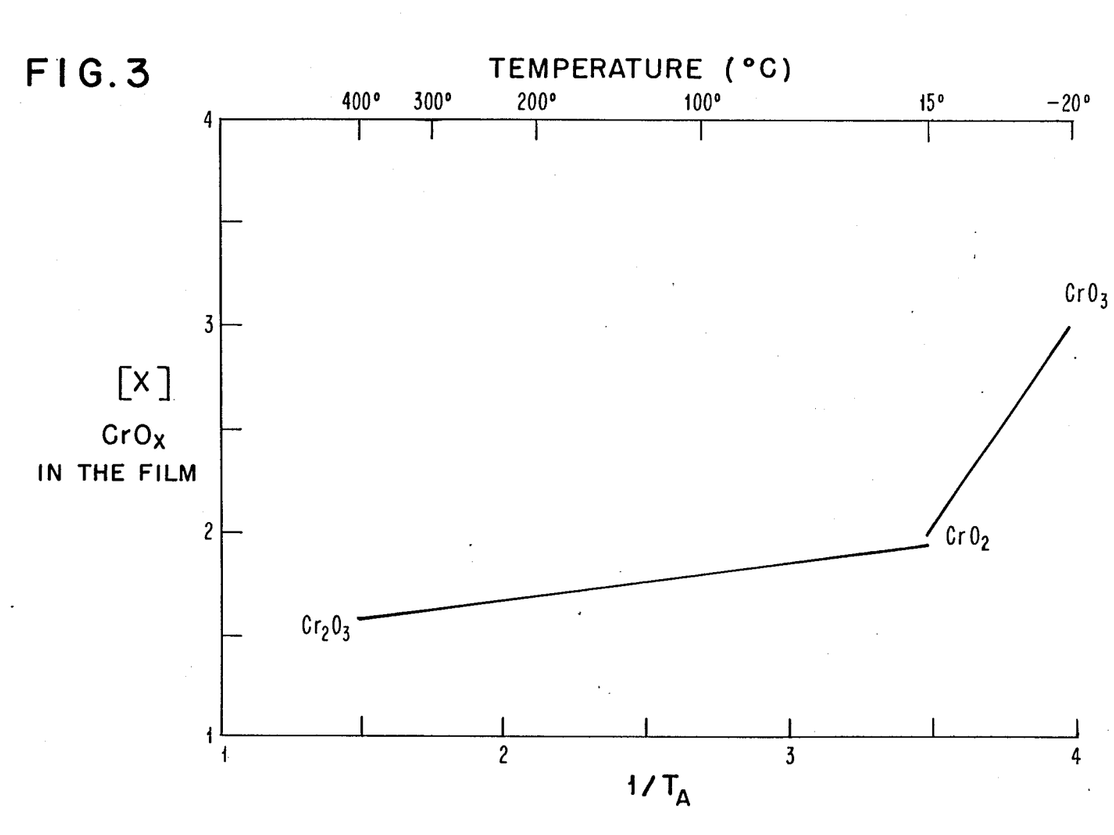
FIG. 3 comprises a curve plotting the stoichiometry of chromium and oxygen versus the temperature effect on said stoichiometry, as the produced film varies between $Cr_2O_3$ and $CrO_2$, the desired constituency.
Figure 4:
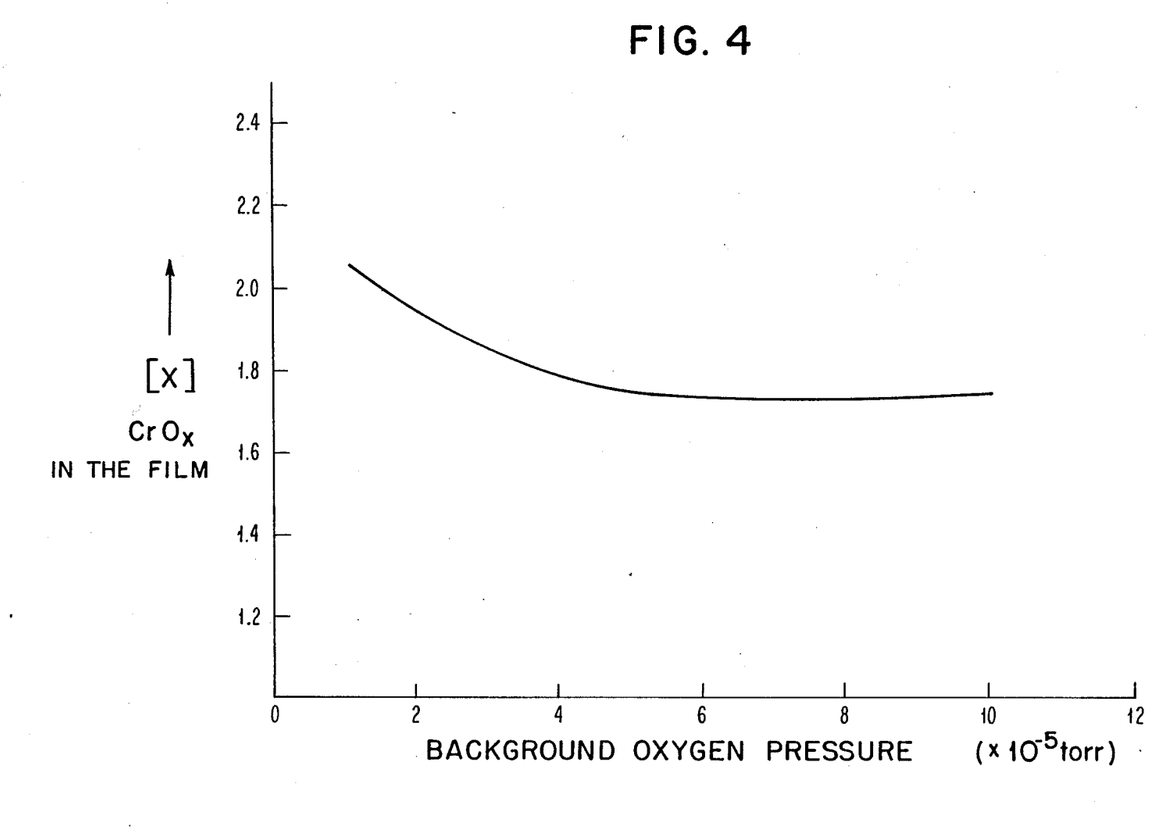
FIG. 4 comprises a curve with the stoichiometry in the film plotted versus the background oxygen pressure.

FIG. 1 shows a simplified apparatus suitable for practicing the present invention. A chromium source 10 is placed on a suitable surface 12 for heating (not shown). Oxygen is introduced through a suitable ionization device 14 from which it is directed onto a sample substrate 16. Substrate heating and temperature control is also provided. The process is carried out in a suitable containment chamber 18 which is evacuated by connection to a vacuum pump. Suitable energies are imparted to the Cr atoms and $O_2$ ions by biasing the various elements within the ranges taught herein.

The magnetic properties of the amorphous $CrO_2$ are improved by substrate heating.

It has been found that utilizing a rapid thermal anneal as the heating process produces greatly improved results. As far as is known this rapid thermal processing anneal has not been applied to nucleate and grow binary compound films such as the oxides of chromium where the oxide is grown from an essentially amorphous mixture with nucleating sites introduced by energetic bombardment producing a latent film mixture.

EXAMPLES

As described above, oxides of chromium, like $CrO_2$ or $Cr_2O_3$, can be readily grown by this method. Thin films of $CrO_x$, (where x varies from 1.6 to 3) have been obtained by evaporation with simultaneous ion bombardment in an oxygen background pressure of $4 \times 10^{-6}$ to $2 \times 10^{-4}$ Torr. The films obtained were 1500 Å thick. Silicon substrates and insulating substrates such as quartz, sapphire, amorphous $SiO_2$ on silicon, etc. were used. By X-ray diffraction the films were amorphous.

Figure 7:
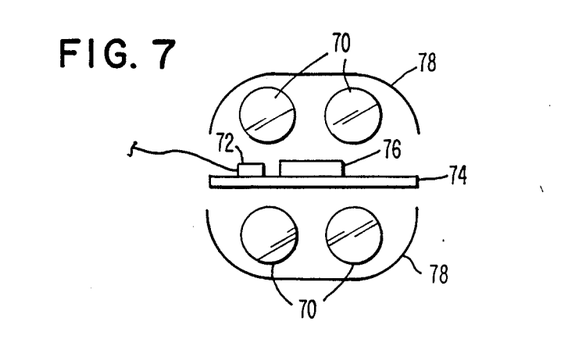
FIG. 7 comprises a cross-sectional view of a flash-lamp activated rapid thermal anneal apparatus.

These films were subjected to rapid thermal annealing in a setup heated with four 1 kW flash lamps 70 (as shown in FIG. 7). The peak temperature was controlled by an automatic power controller (not shown). The samples 76 were placed on a quartz platform 74. The whole annealing step is carried out in a suitable container in an air or oxygen atmosphere. Reflectors 78 perform the function of concentrating the energy produced by the flash lamps 70 into the samples 76. Other rapid thermal processes such as electron bombardment, as is well known in the art, laser flash annealing or other energetic photon beam processes such as microwaves.

Figure 5:
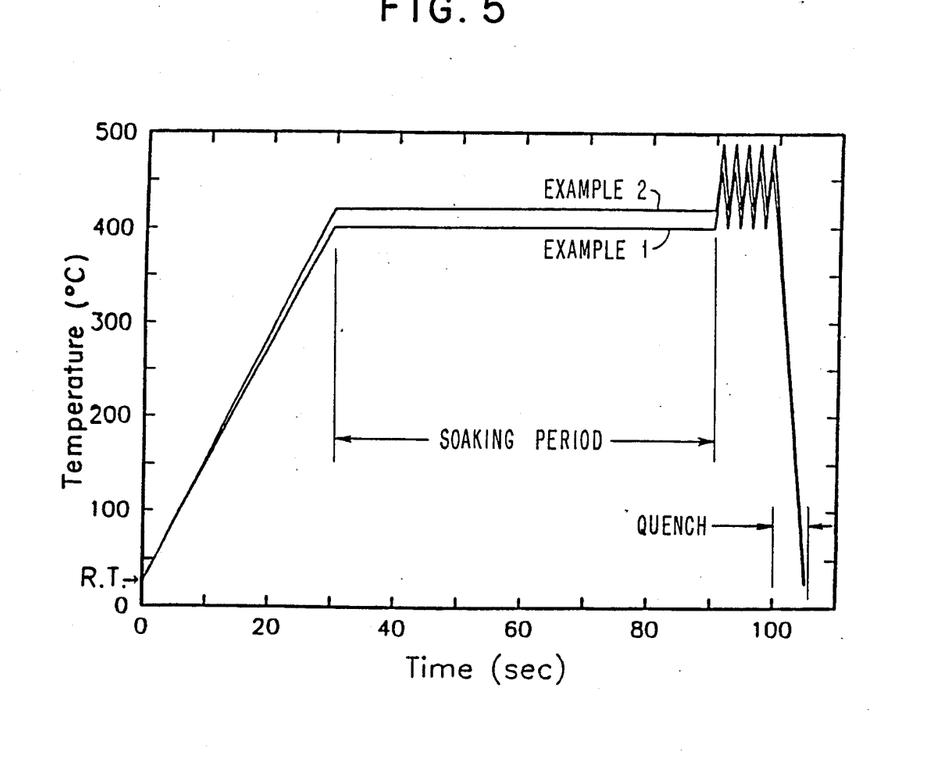
FIG. 5 comprises two temperature versus time curves for the rapid thermal anneal step of the present process.

A time versus temperature profile is shown in FIG. 5. Soak temperatures of 400°, and 430° C. were used. These were reached with a very steep temperature-time ramp. The samples reached the desired temperature (as measured by a thermocouple placed near the sample) within 40 seconds. At this temperature, the samples were soaked (kept at the elevated temperature) for periods of time ranging from 30 seconds to 2 minutes. After this soak period, the specimens were given uniformly 5 flashes over 10 seconds. The peak temperatures reached were 490° C. As soon as the peak was reached the controller was switched off and the samples quenched.

After each flash anneal, the samples were examined and (a) their conductivity (resistivity) measured and (b) x-ray diffraction pattern taken. The resistivity varied from very high values (1000 ohm-cm) to fractions of an ohm-cm after annealing ($CrO_2$ is a conducting oxide). In general, the x-ray patterns showed no structure to start with but crystallites grew to a large size as successive anneals were carried out. Films which were deposited with simultaneous ion bombardment, $O_2^+$ ion energies of 150 eV, 270 eV, and 400 eV, showed excellent conversion of the latent film mixture to polycrystalline $CrO_2$ after pulse annealing. With $O_2^+$ energies both higher and lower than these values (<150 eV and >500 eV) the films tend to crystallize into the $Cr_2O_3$ structure.

This could be seen in x-ray diffraction patterns. No pattern was discernible at 490° C.; however, the $CrO_2$ pattern became clearly visible with a peak temperature of 502° C. Similar diffraction patterns for $Cr_2O_3$ could clearly be seen.

As stated previously heat sources other than radiant energy (e.g., flash tube) can be used for the rapid thermal annealing. For example, electron beams can be used. In situ observations of electron beam rapid thermal annealing into the $CrO_2$ phase have been made in a Transmission Electron Microscopy (TEM).

The structure is self-evident from what is stated above. For in-plane magnetic recording the shape anisotropy will force the magnetization into the plane of the film. From methods that have been developed in the laboratory, anisotropy directions can be controlled. For example, ion bombardment with an ion velocity component parallel to the film surface has been used to create an anisotropy direction in the plane of the film.

In studying the formation of metastable compounds such as $CrO_2$, films have been deposited by thermal evaporation from a metallic Cr evaporation source while bombarding the growing film with either $O_2^+$ ions or a mixture of $Ar^+$ and $O_2^+$ ions from a multiple aperture Kaufman ion source. Due to the operation of the ion source, there is also a neutral molecular bombardment of the growing film from gas that escapes from the ion source. The composition of films produced were measured in situ using Rutherford backscattering. The chemical bonding of the oxygen and chromium is measured using Electron Spectroscopy for Chemical Analysis (ESCA). When using mixtures of Ar and $O_2$ gases in the ion source, it was not possible to incorporate more oxygen in the film than that corresponding to the $Cr_2O_3$ stoichiometry. Films with a higher oxygen content than the $CrO_2$ composition have been formed by depositing the films at a temperature of $-190°$ C. Deposited latent mixture films are amorphous. This has been established by X-ray diffraction. ESCA measurements show that films deposited with a $CrO_2$ composition do have $CrO_2$ chemical bonding along with other phases of Cr—O bonding. Although the films are amorphous, films that are ferromagnetic can be deposited at room temperature. Vibrating sample magnetometer measurements of the $CrO_2$ films show ferromagnetism in these films.

By rapidly thermally annealing amorphous $CrO_2$ films, it has been possible to optimize or enhance the magnetic properties of the as deposited films to that expected for crystalline $CrO_2$. Vibrating sample magnetometer measurements of such films treated by the rapid thermal anneal step of the present invention have clearly established this.

The methods described above are believed to be extendable to other energetic particle bombardment processes such as magnetron sputtering [1, 6, 7], ion beam deposition [3], diode sputtering [2], arc evaporation [5] and ion plating [4]. Literature references describing these processes are set forth below. What these other deposition processes have in common with the previously described $O_2$ ion beam bombardment/Cr evaporation deposition process are energetic ion (particle) bombardment while growing the film. In these other processes the following process parameters need to be controlled: (1) ion energy, (2) relative arrival rates of the Cr atoms and the $O_2$ ions, and (3) the substrate temperature.

Figure 6:
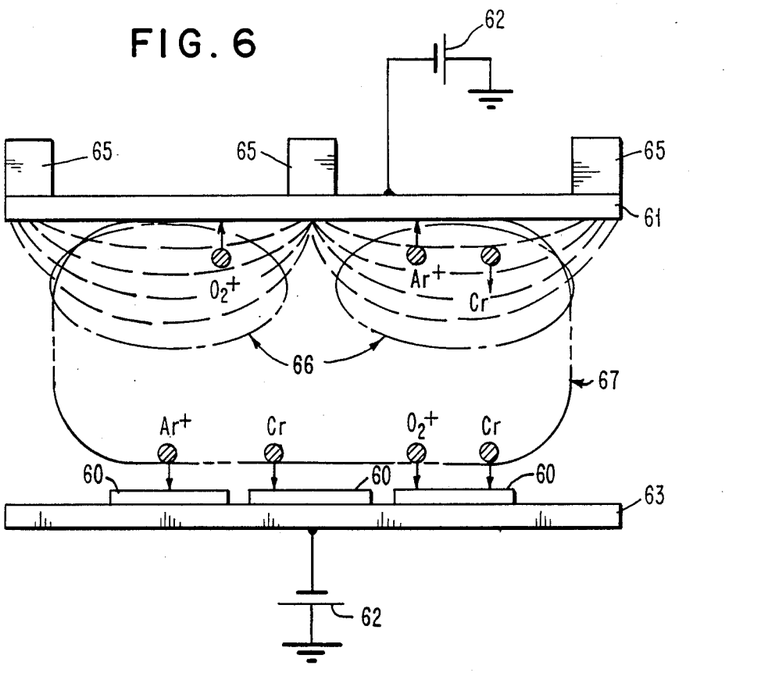
FIG. 6 comprises a cross-sectional view of an alternative apparatus for providing energetic particle bombardment of the sample surface onto which the latent film mixture is deposited.

FIG. 6 is a schematic cross-section of a magnetron sputtering set-up in which energetic Cr ions impinge on the sample substrates 60. A chromium cathode 61 is connected to a suitable dc or rf supply 62 with a matching metwork, as in the lower sample support 63. The magnetron produces a magnetic field 64 via pole pieces 65. This field in turn produces intense glow regions 66 and the less intense glow region 67. Energetic chromium ions (Cr) are shown moving toward the sample substrates 60. The $O_2^+$ ions are also shown. The $Ar^+$ ions are shown also. These would be present when it is desired to control the stoichiometry of the film being deposited to form a $Cr_2O_3$ layer. The Ar flow would be stopped when it is desired to form the latent film mixture favorable to $CrO_2$ formation. This entire apparatus would of course be placed in a containment chamber (not shown) as would be understood by those skilled in the art.

It is known that the only conducting state in the Cr-$O_x$ system is the $CrO_2$ state. $CrO_2$ films produced by the present process are conducting. Heat treating using the herein disclosed rapid thermal annealing techniques significantly reduce the resistivity in the $CrO_2$ films. This is further evidence of the conversion of other chrome oxide states which may exist in the initial latent film mixture into the $CrO_2$ state.

REFERENCES

[1] "Thin Film Processes," J. L. Vossen and W. Kern, Academic Press (1978), pp. 76–173.
[2] Op. Cit., pp. 12–73.
[3] Op. Cit., pp. 175–206.
[4] "Deposition Technologies for Films and Coatings," R. F. Bunshah et al., Noyes Publications (1982), pp. 244–287.
[5] Op. Cit., p. 108 and references therein.
[6] "Plastic Flow in Ion-Assisted Deposition of Refractory Metals," B. Window, F. Sharples and N. Savvides, J. Vac. Sci. Technol., A6 (1988), pp. 2333–2340.
[7] "Hollow-Cathode-Enhanced Magnetron Sputtering," J. J. Cuomo and S. M. Rossnagel, J. Vac. Sci. Technol., A4 (1986), pp. 393–396.

Having thus described the invention, what is claimed as new and desired to be secured by Letters Patent is as follows:

1. A process for forming thin films of metastable binary compounds of the form $AB_x$ which comprises:
   depositing both constituent materials on a substrate by evaporative techniques; and
   concurrently bombarding the substrate with high energy ions of at least one of the materials to produce latent metastable sites in a latent $AB_x$ film forming layer;
   treating the as-grown latent film forming layer with a rapid thermal anneal heat treatment upon completion of the deposition step which causes the latent film forming layer to form the desired crystalline metastable $AB_x$ compound.

2. A process as set forth in claim 1 wherein the binary metastable compound is chromium dioxide and wherein the rapid thermal anneal step includes heating the latent film forming layer to about 500° C. after first soaking the film to raise its temperature to about 400° C.

3. A process for forming chromium dioxide thin films which are receptive to high density magnetic recording, said process comprising:
   depositing both chromium and oxygen on a substrate by evaporative techniques; and
   concurrently bombarding the substrate with high energy ions of at least one of the film constituents to form a latent $CrO_x$ film forming layer, carrying out said process at approximately room temperature;
   heat treating the latent $CrO_x$ film forming layer upon completion of the deposition step by a rapid thermal anneal step which raises the temperature of the as-grown film to about 500° C., said rapid thermal anneal step comprising a series of separate pulses over a predetermined time span;
   after the rapid thermal anneal, rapidly quenching the sample to room temperature.

4. A process for forming thin films as set forth in claim 3 including maintaining said substrate at a temperature between 10° and 40° C. during said latent film forming step.

5. A process for forming thin chromium dioxide films as set forth in claim 3 wherein the step of providing a bombardment source from one of the constituent components of the film includes introducing high energy $O_2+$ ions into a process reaction chamber and directing same to impinge on said substrate.

6. A process for forming thin chromium dioxide films as set forth in claim 5 wherein the step of providing an ion bombardment source further includes impinging said $O_2+$ ions on said substrate in a direction substantially parallel to the surface to enhance the magnetic anisotropy of the film.

7. A process for forming thin chromium dioxide films as set forth in claim 3 wherein the step of providing a bombardment source from one of the constituent components of the film includes providing high energy chromium atoms which impinge on the substrate surface and form metastable nucleation sites within the latent film forming layer.

8. A process for forming chromium dioxide thin films as set forth in claim 3 further including the step of vapor depositing at least one anisotropic doping agent on the substrate together with the chromium and oxygen chosen from the group including Fe, Co, Sb and In to enhance the magnetic anisotropy characteristics of the resulting $CrO_2$ film.

9. A process for forming a chromium dioxide ($CrO_2$) thin film on a substrate suitable for high density magnetic recording comprising the steps of:
   depositing a latent film forming layer on the substrate by vapor depositing chromium atoms from a metallic source onto the substrate; and
   concurrently forming a high energy beam of $O_2+$ ions and impinging same upon said substrate utilizing high energy ion beam apparatus, said steps being carried out in an evacuated chamber, said latent film forming layer comprising an amorphous layer of $CrO_x$ having a plurality of metastable nuclei therein;
   performing a rapid thermal anneal heating operation on said latent film upon completion of the deposition step at approximately atmospheric pressure, said heating step comprising first heating the substrate to a first level and then rapidly heating same to approximately 500° C. for a period of between about 5 and 10 seconds.

10. A process as set forth in claim 9 including the step of heating the substrate prior to depositing the $CrO_x$ latent film forming layer thereon to a temperature of between approximately 10° and 40° C.

11. A process as set forth in claim 10 wherein metallic chromium atoms/ions are deposited onto the substrate via magnetron sputtering in an oxygen atmosphere.

12. A process for forming a chromium dioxide thin film as set forth in claim 9 wherein the rapid thermal anneal step includes:
   first heating the substrate having the latent film forming layer thereon to approximately 400° C.; and
   then rapidly raising the temperature to approximately 500° C. as a series of at least 5 pulses within a 10-second interval; and
   then rapidly quenching the substrate to room temperature.

13. A process for forming chromium dioxide thin films as set forth in claim 9 including the step of forming a second layer comprising $Cr_2O_3$ on top of the latent $CrO_x$ film forming layer, said last step comprising discontinuing the ion bombardment of the substrate and increasing the arrival ratio of chromium to oxygen to approach the stoichiometry of $Cr_2O_3$ and raising the substrate temperature to between about 40°–80° C.

14. The process of forming a second layer of $Cr_2O_3$ on top of a $CrO_2$ film as set forth in claim 13 including utilizing a 50% argon/oxygen atmosphere within the reaction chamber.

15. A process for forming a chromium dioxide thin film as set forth in claim 9 wherein the rapid thermal anneal step includes:

heating the sample by photo-optical heating by means of a Xenon flash lamp apparatus.

* * * * *